United States Patent

[11] 3,588,768

| [72] | Inventor | Max Baermann<br>506 Bensberg Wulfshof Bezirk Cologne,<br>Germany |
|---|---|---|
| [21] | Appl. No. | 830,561 |
| [22] | Filed | May 7, 1969 |
| [45] | Patented | June 28, 1971 |
| [32] | Priority | May 17, 1968 |
| [33] | | Germany |
| [31] | | P 17 66 410.7 |
| | | Continuation-in-part of application Ser. No.<br>732,131, May 27, 1968. |

[54] ADJUSTABLE MAGNETIC BRAKING SYSTEM
20 Claims, 14 Drawing Figs.

[52] U.S. Cl. .................................................. 335/225,
335/306
[51] Int. Cl. ..................................................... H01f 7/08
[50] Field of Search ............................................ 335/302,
306, 225

[56] References Cited
UNITED STATES PATENTS

| 2,832,932 | 4/1958 | Baermann ..................... | 335/306X |
| 2,854,607 | 9/1958 | Niklas et al. ................... | 335/306X |
| 3,184,654 | 5/1965 | Bey ............................... | 335/302X |

*Primary Examiner*—G. Harris
*Attorney*—Meyer, Tilberry and Body

ABSTRACT: A magnetic braking system for electric meters having at least one braking magnet and an adjusting magnet contiguous to the braking magnet which can be moved with respect to the braking magnet to adjust the magnetic flux in an airgap. The braking magnet is fixed between the end members of a U-shaped carrier body to form the airgap and may have a recess in which the adjusting magnet is positioned. The braking magnet is magnetized with two or more poles of alternating polarity along the surface facing the airgap, and the adjusting magnet is magnetized with poles of alternating polarity so that the poles align with poles of the braking magnet. Control of the flux in the airgap is facilitated by axially sliding or turning the adjusting magnet relative to the braking magnet to change the relative position of the poles.

Patented June 28, 1971

Inventor
MAX BAERMANN
By
Meyer, Tilberry & Body
Attorneys

Patented June 28, 1971

Inventor
MAX BAERMANN
By
Meyer, Tilberry & Body
Attorneys

Patented June 28, 1971

Inventor
MAX BAERMANN
By
Meyer, Tilberry & Body
Attorneys

Patented June 28, 1971

INVENTOR.
MAX BAERMANN
BY
Meyer, Tilberry & Body
ATTORNEYS.

ADJUSTABLE MAGNETIC BRAKING SYSTEM

This application is a continuation-in-part of my copending application Ser. No. 732,131, filed May 27, 1968.

The invention relates to a permanent magnet braking system, preferably for electric meters, with a fine adjustment for controlling the magnetic flux in the airgap. Generally such braking magnet systems are composed of two braking magnets arranged on a U-shaped carrier body at some distance from each other with their two opposing surfaces forming an airgap. The magnetic field of the braking magnets pass through this airgap and the meter braking disc positioned therein. The U-shaped carrier body can be made of ferromagnetic material so that it serves as an iron return path. In case of using a ferromagnetic return path body, designs have also become known wherein only one branch has been provided with a permanent magnet, while the opposite branch forms the counterpole and defines the airgap.

Providing braking magnet systems for electric meters with a fine adjustment in order to achieve a precise control of the braking effect is already known. Hitherto this problem was done virtually by two methods. In the first method, the whole system is designed to be rotary in order that the depth of penetration by the meter braking disc of the measuring device into the airgap of the braking system can be varied.

This adjustment of the braking value by rotating the complete system requires rotating mechanisms, setting screws, bearings and the like of complicated design, which apart from their relatively high production costs also involve relatively large dimensions.

The other method of adjusting the braking effect is providing magnetic shunts by means of control discs of high permeability, flux conducting pieces and the like. These shunts short circuit part of the magnetic flux in order to vary the braking force influencing the meter braking disc.

The adjustment by means of such magnetic shunts involves, however, a change in the characteristic circuit of the magnet system so that the magnetic values of such system do not remain constant Even though the permanent magnets have been carefully stabilized they will not maintain their constant values in the long run, especially when under high meter load, where strong counter fields influence the high permeable conducting pieces, and the braking force will change. Moreover this adjustment by means of a magnetic shunt involves the disadvantage that in the maximum position the braking torque will not reach as high a value as would result without the shunt.

It is the purpose of the present invention to avoid these disadvantages and create a braking magnet system especially for electric meters provided with fine adjustment for controlling the magnetic flux, wherein the stability of the braking magnets is guaranteed, wherein the maximum position the full braking torque obtainable with the magnet material used is available, and wherein a very closely stepped control of the braking torque is possible within a large range of adjustment.

In accordance with the invention, a raking magnet system is provided using at least one braking magnet having an adjusting magnet, the position of which can e varied with respect to the raking magnet to control the eddy current braking effect on a nonmagnetic conductive meter braking disc moving in the negative field in the airgap.

Varying the position of the adjusting magnet by rotating or shifting the same with respect to the raking magnet changes the total magnetic flux inside the airgap, because the magnetic force of the adjusting magnet can be made to either add to or subtract from the magnetic force of the raking magnet. The magnetic flux reduction inside the airgap results in a reduction of the braking torque.

By varying the position of the adjusting magnet with respect to the braking magnet, the condition of the airgap flux is modified in a lineal relation to the adjustment made. The braking torque adjustment is reversible because there is no hysteresis in the braking magnet.

The possibility of strong exterior magnetic fields appearing does not have any detrimental effect on the system because the adjusting magnet has been magnetized to saturation. With this invention the disadvantages of using a magnetic shunt of soft iron are avoided.

In an advantageous embodiment of the invention, the braking magnet has been provided with a recess in which the adjusting magnet is movably arranged. The recess in which the adjusting magnets of corresponding shape is positioned can be of circular, rectangular or trough shape, and adjustment is effected by rotating or shifting the adjusting magnet. It is also possible to position the movable adjusting magnet on an exterior surface of at least one braking magnet, where it can be shifted or rotated, thereby obviating the need for the recess.

The adjusting magnet has been so arranged in or on the braking magnet so that the lines of magnetic force passing through the interior of the adjusting magnet force passing through the interior of the adjusting magnet penetrate the braking magnet. This is best achieved by magnetizing the braking magnets with the adjusting magnet positioned.

In another advantageous embodiment of the invention, the main flux can be reduced or increased where it is most effective, i.e., preferably in the range of the outside diameter of the meter braking disc, so that the adjustment is very effective in spite of the adjusting magnet containing very little magnetic material. This effect is achieved by arranging the adjusting magnet on the lateral surface of the braking magnet facing the closed side of the U-shaped carrier body. In this advantageous design the adjusting magnet is movably arranged or pivoted in a bearing part having a casing of nonmagnetic material. The bearing part and the casing with the adjusting magnet inserted are laterally inserted in the U-shaped carrier body, where it rests adjacent the bridge joining the two branches of the U-shaped carrier body and on the braking magnet adjacent to the adjusting magnet. Between the bearing part respectively, the casing and the joining bridge, a bent plate spring is inserted, which presses the bearing part respectively, the casing with the adjusting magnet, against the braking magnet. The plate spring is designed so that it immediately presses on the bearing part as well as on the cylindrical adjusting magnet, so that the adjusting magnet cannot change its position once it is set. The spring can also form part of the casing, from which it can be punched and bent out. If necessary, the adjusting magnet can be provided with grooves on its circumference. For setting the adjusting magnet, the bearing part is provided with a screw spindle to which a guiding nut joined with the adjusting magnet is attached. It is also possible to thread the adjusting magnet so that the screw spindle can directly engage there.

In another advantageous embodiment of the invention, it is possible to exactly determine the degree to which the braking torque must be adjusted, and to simultaneously induce a stop to prevent further unwanted movement of the set adjusting magnet. Accordingly, there is provided at least one surface containing a plurality of teeth and a catching element to engage the teeth. If the number of teeth are selected so that a displacement of one tooth means a change in the braking torque of a percentage of the total range of adjustment, it can be exactly determined by how many teeth the adjusting magnet must be displaced in order to obtain the desired change in the braking torque. On the other hand, it can be recognized that due to a displacement by a given number of teeth, the braking torque has been changed by a corresponding percentage.

Various types of magnetization are possible for the braking magnets. Apart from a two-pole magnetization, a three-pole one has proved especially advantageous, because it produces a particularly good raking torque. In this three-pole magnetization, the braking are magnetized on their surface facing the meter braking disc with three poles of alternating polarity so that on the surface of the magnet there are three poles which are faced by three other poles of unlike polarity, each on the opposite braking magnet. In this magnetization, the passage of the lines of magnetic force inside the magnets is bow-shaped.

The adjusting magnet is magnetized with poles of alternating polarity, and the poles spaces are the same as those on the braking magnets.

The braking magnets as well as the adjusting magnet are made of a permanent material of high coercive force, preferably of more than 800 Oersteds. They are composed of a mixture of a powdered permanent magnet material and a plastic binder, which mixture has been shaped to form the permanent magnets by means of pressure and heat, e.g., by pressing or injection molding.

The adjusting magnet may be provided with an operating and indicating device, by means of which the desired control position can be set.

The invention may take physical form in certain parts and arrangements of parts; several embodiments of the invention, from which further details will become obvious will be described in detail in this specification and illustrated in the accompanying drawings which form a part hereof and wherein.

Figure 1:
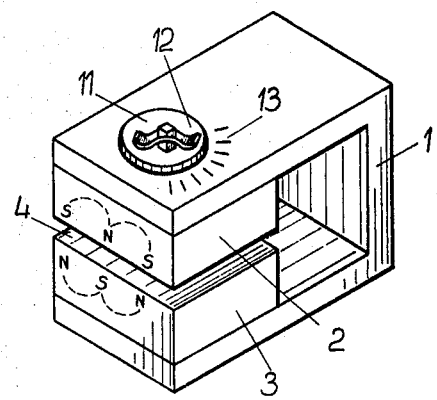
FIG. 1 is a perspective view of a magnetic braking system.

Referring now to the drawings, wherein the showings are for the purposes of illustrating the preferred embodiment of the invention only and not for the purposes of limiting the same. The braking magnet system shown in FIG. 1 is composed of a U-shaped carrier body 1, to which the braking magnets 2 and 3 have been fastened and spaced from each other so that between their surfaces facing each other there is an airgap 4, in which a meter disc 5 (FIG. 3) rotates. The meter braking disc is made from a nonmagnetic conductive material so that eddy currents may be generated in a well-known manner. The U-shaped carrier body can be made of ferromagnetic material so that it serves as return path for the lines of magnetic force.

In the magnetization shown in the present example it is not necessary to make the carrier body of ferromagnetic material. At least one of the magnets 2, 3 has been provided with a recess 6.

Figure 2:
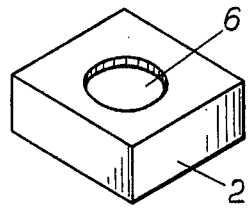
FIG. 2 is a perspective view of a braking magnet with a circular recess.

In the braking magnet 2 shown in perspective view in FIG. 2, the recess 6 is of circular shape. As it can be seen from FIG. 3, the adjusting magnet 7, having a disc shape adapted to the recess, has been pivoted therein. For this purpose the adjusting magnet 7 has been provided with a shaft 8 protruding through a bore of the one branch 9 of the U-shaped carrier body. The adjusting magnet 7 is held in the recess 6 by means of the spring 10, which can simultaneously serve as a rotary handle for controlling the adjusting magnet. Moreover, the spring serves to avoid any change of the braking torque, after it has once been set.

Figure 3:
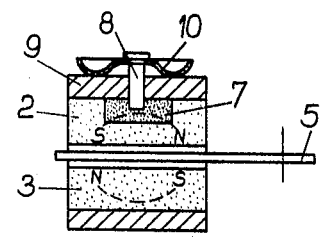
FIG. 3 is a vertical section through another magnetic braking system with the adjusting magnet inserted.

As it can be seen from FIG. 3, the lines of magnetic force passing through the interior of the braking magnet also penetrate the adjusting magnet. In this embodiment the braking magnet has been magnetized with two poles of alternating polarity, whereby the passage of the lines of magnetic force inside the magnet is bow-shaped. Magnetization is effected when the adjusting magnet has been inserted, so that in this position the maximum braking torque is available.

Figure 4:
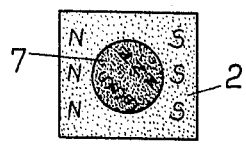
FIG. 4 is a top view of a braking magnet with the adjusting magnet inserted, which is not set in maximum position.

If the adjusting magnet is rotated by a certain angle, as in FIG. 4, the magnetic flux and the braking torque is reduced due to a change of the passage of the lines of magnetic force. In this embodiment the maximum reduction occurs, if the rotation comprises an angle of 180°, because in this case the lines of magnetic force of the braking magnet oppose those of the adjusting magnet.

Figure 6:
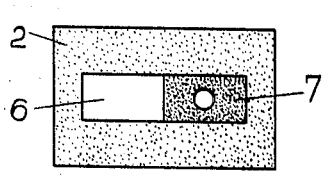
FIG. 6 is a top view of the embodiment according to FIG. 5.
Figure 5:
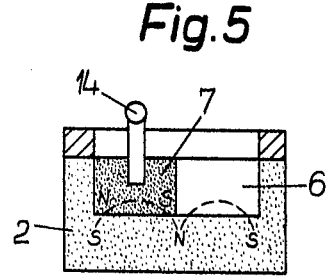
FIG. 5 is another embodiment of a braking magnet in longitudinal section, wherein the braking magnet has been movably arranged in a rectangular recess.

Another embodiment of the invention is shown in FIG. 5, wherein the braking magnet 2 has been provided with a rectangular recess 6. In this recess a rectangular adjusting magnet 7 adapted to the recess has been movably arranged in the longitudinal direction. This adjusting magnet can be shifted from outside the braking magnet 2 by means of a bolt 14. In this embodiment of the invention the raking magnet has been magnetized with three poles. The adjusting magnet has been magnetized, however, with only two poles. In the one end position maintained by the adjusting magnet during magnetization, the maximum braking torque is available, while in the other end position shown in FIG. 6 the magnet has been weakened to the maximum, because in this position the lines of magnetic force of the adjusting magnet oppose those of the braking magnet. The degree of adjustment depends on the dimensions of the adjusting magnet in proportion to the braking magnet and can be shown by means of an indicating device. The adjusting magnet has been joined with an operating disc 11, which has been provided with a pointer 12. A graduation 13 on the carrier body has been provided so that the position of the pointer indicates the percentage reduction of the braking torque.

In order to avoid a demagnetization of the magnets, a magnetic material of high coercive force, preferably of more than 800 Oersteds, is used. It is convenient to make the magnets according to the present invention of a powdered permanent magnet material and a plastic binder in the known way by pressing or injection molding. The magnets are provided with the recesses taught by the invention when they are produced, and the operating elements can be immediately pressed into the adjusting magnet.

Figure 7:
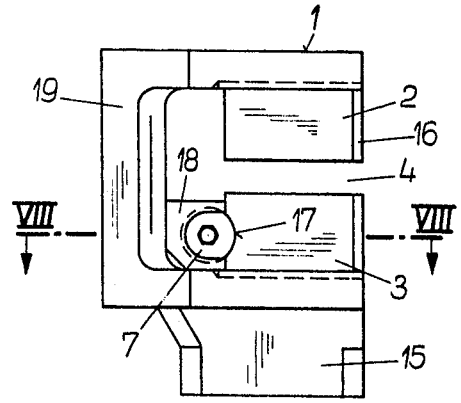
FIG. 7 is a lateral view of third magnetic braking system.

The permanent magnet raking system according to FIG. 7 is composed of the U-shaped carrier body 1 provided with a support 15, by means of which such carrier body is fastened to the meter body. On the interior branches of the U-shaped carrier body, the two braking magnets 2 and 3 have been fastened spaced from each other in a way that their magnetized surfaces facing each other enclose an airgap 4. The meter raking disc, not shown here, rotates in this airgap. The magnets 2 and 3 have on their exterior side been provided with pieces 16 for temperature compensation.

On its lateral surface facing the closed side of the U-shaped carrier body the braking magnet 3 has been provided with a trough-shaped recess 17, in which the cylindric adjusting magnet 7 has been inserted. Adjacent to this lateral surface of the braking magnet is the bearing part 18, the recess of which forms together with the recess of the braking magnet a circular cross section. The adjusting magnet 7 has been pivoted inside the bearing part 18.

Figure 8:
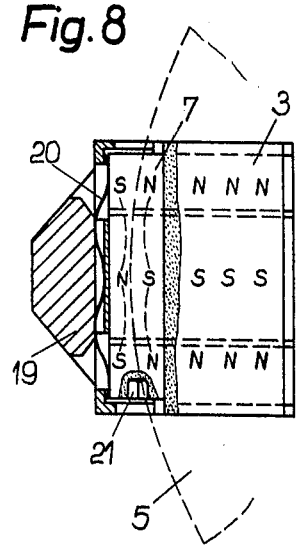
FIG. 8 is a horizontal section through the magnetic braking system taken along line VIII–VIII of FIG. 7.

It can be seen from FIG. 8, that the adjusting magnet 7 has been magnetized so that the passage of the lines of magnetic force inside the magnet from the north to the south pole forms a bow. The three poles on the braking magnet in axial direction have alternating polarity, and the pole spaces correspond to those of the braking magnets. In FIG. 8, the polarities are marked with the letters N and S.

The adjusting magnet 7 is supported inside the bearing part 18, as can be seen from FIG. 8. On the side of the bearing part facing the joining bridge 19 of the U-shaped carrier body a bent plate spring 20 has been inserted propped by the joining bridge and pressing with its exterior ends the adjusting magnet. The middle part of the spring 20 presses the bearing part 18 against the braking magnet 3.

By this advantageous design not only is the bearing part 18 held inside the braking magnet system in a simple way, but also any unwanted movement of the adjusting magnet 7, and thus a variation of the braking torque once set, is avoided. The fine adjustment of the desired braking torque is effected by means of a setting key. For this purpose, the adjusting magnet has been provided on one or both front surfaces with a hexagonal recess 21.

Figure 9:
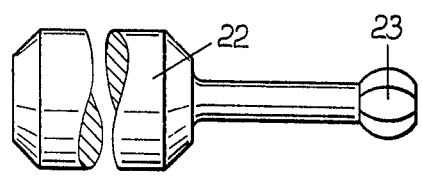
FIG. 9 is a lateral view of a setting key in enlarged illustration.

For facilitating an exact setting of the adjusting magnet, when the braking magnet system is rotated around an axis which is vertical to the plane of the meter braking disc, such rotation is frequently effected for achieving a rough adjustment of the braking torque, the setting key 22 has been provided with a hexagon of sphere shape 23, as shown in FIG. 9. By means of this key it is possible to effect the adjustment also in angular position to the axis of the adjusting magnet without running the risk that the hexagonal recess of the adjusting magnet might break out. Of course, the recess and the setting key can be of different cross section.

Figure 10:
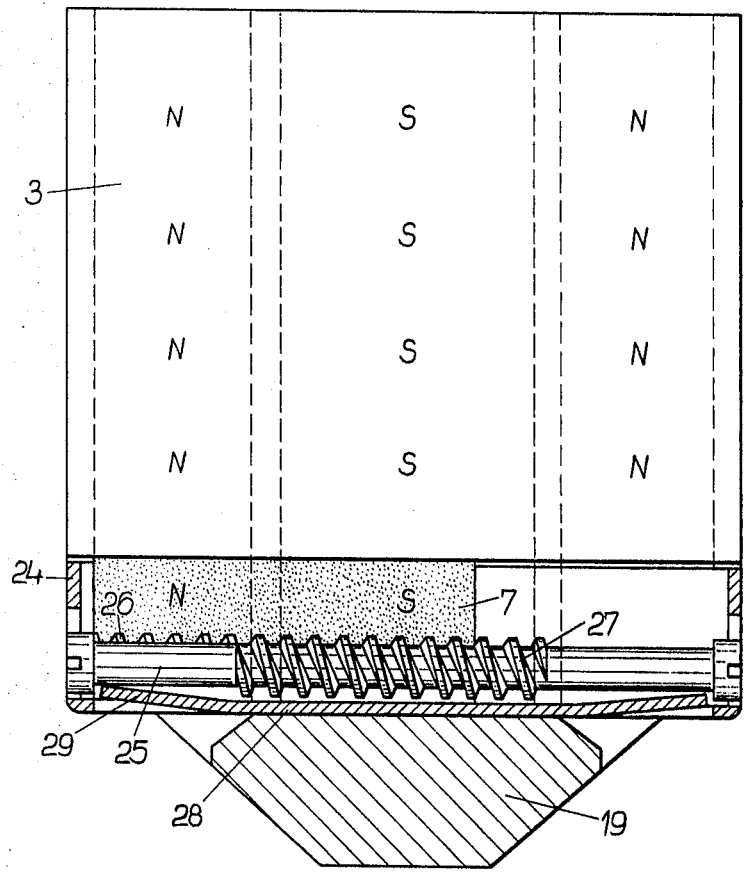
FIG. 10 is a horizontal section through the braking system according to FIG. 8 in enlarge illustration, wherein the adjusting magnet has been movably arranged by means of a screw spindle.

In FIG. 10 a braking magnet system is shown in cross section having essentially the same design as the braking magnet system shown in FIGS. 7 and 8, wherein, however, the adjusting magnet can be shifted. In this embodiment of the invention the adjusting magnet 7 is of rectangular shape and positioned in a casing 24 which is open on one side and serves for guiding the adjusting magnet. For shifting the adjusting magnet, a screw spindle 25 has been provided in the casing and the adjusting magnet has been immediately provided with threads 26 in which the thread 27 of the screw spindle engages. Instead of the pressed-in thread, the adjusting magnet can contain a guiding nut fitted on the screw spindle arranged in the casing. From the bottom 28 of the casing tongue-shaped springs 29 have been bent out, which serve for holding the screw spindle inside the casing in place and pressing the adjusting magnet against the lateral surface of the braking magnet 3, whereby the bottom of the casing is propped by the joining bridge 19.

In the position of the adjusting magnet relative to the braking magnet shown in FIG. 10, the maximum braking torque has been set. By turning the screw spindle the magnet is shifted along its longitudinal axis to the other end position, where the minimum raking moment is set. By this embodiment of the invention a very closely stepped adjustment of the braking torque is achieved.

Figure 11:
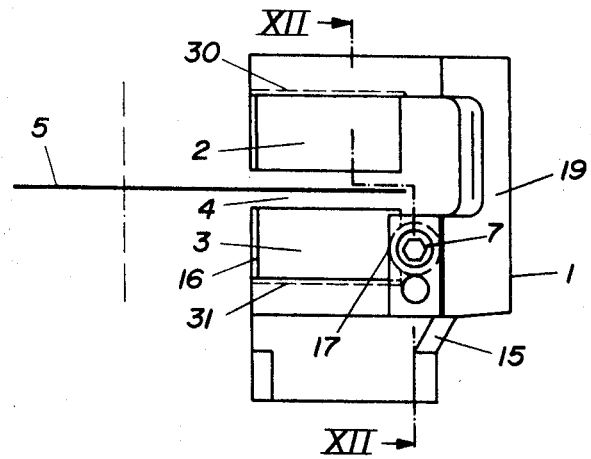
FIG. 11 is a lateral view of a fourth magnetic braking system.

The permanently magnetic braking system according to FIG. 11 includes a U-shaped carrier body 1, preferably made of an aluminum alloy, and having a support 15 for fastening it to a meter frame. On the interior branches 30, 31 of the U-shaped carrier body, two braking magnets 2, 3 have been fastened spaced apart from one another so that between their magnetized surfaces, which face each other, there is an airgap 4. The meter braking disc 5 rotates in the airgap 4. The front sides of the braking magnets 2, 3 can be provided with pieces 16 for temperature compensation. An adjusting magnet 7 is carried in a bore 32 provided in the carrier body 1 and protrudes therefrom with part of its circumference disposed in a trough-shaped recess 17 located on the lateral surface of the braking magnet 3 adjacent the joining bridge 19 of the carrier body.

In one or both of the end surfaces of the adjusting magnet 7 there is provided a hexagonal recesses 21, into which may be inserted a setting key 22 (as shown in FIG. 10) in order to rotate the adjusting magnet for fine adjustment of the braking torque.

Figure 12:
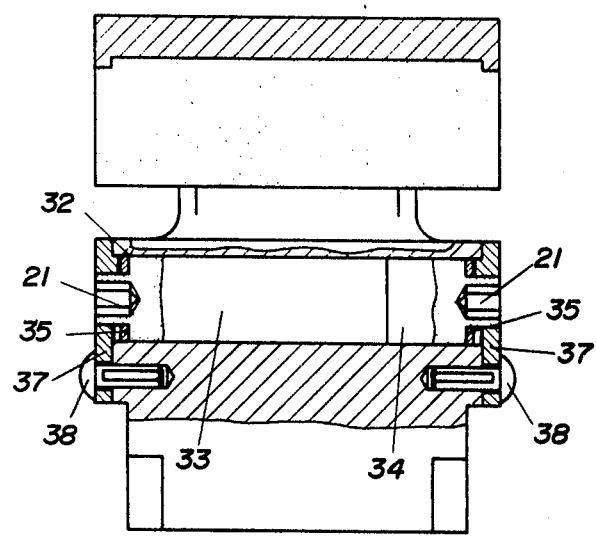
FIG. 12 is a horizontal section through the magnetic braking system taken along line XII–XII of FIG. 11.
Figure 13:
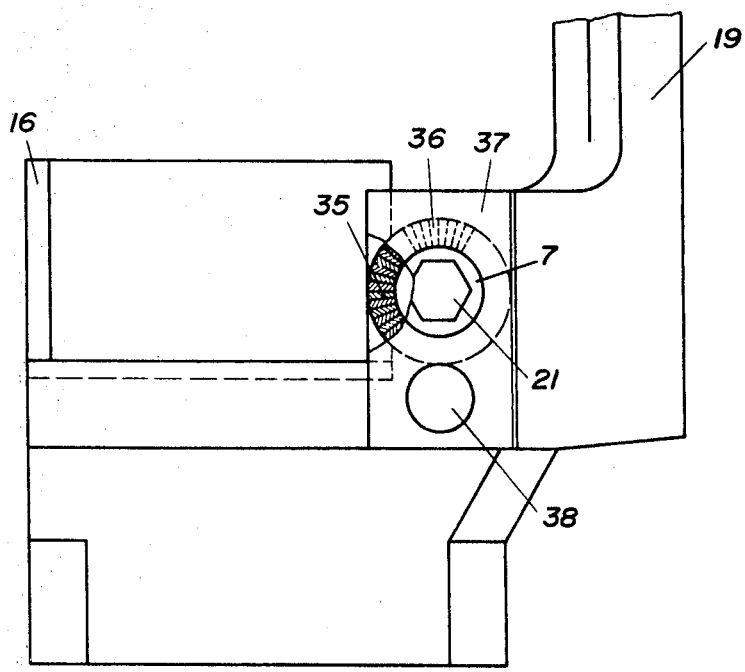
FIG. 13 is an enlarged partial lateral view, partly broken away, of the magnetic braking system of FIG. 11.

In the embodiment according to FIG. 12, the adjusting magnet 7 has been divided into two magnet segments 33,34 of different size. The larger of the two magnet segments 33 is rotated first in order to roughly adjust the braking torque, while the smaller magnet segment 34 is rotated second to obtain a finer adjustment. This result could also be obtained by making the adjusting magnet 7 of magnetic materials having different magnetic effects. This same result can be achieved by magnetizing one segment to produce a flux density which differs from the flux density produced by the second segment. The exterior end surfaces of the magnet segments 33, 34 have been provided with a toothing 35. As shown in FIGS. 12 and 13 the toothing 35 is a separate tooth ring which has been attached to the end surfaces of the magnet segments 33, 34 by means of an adhesive. It is to be appreciated that the toothing construction is also applicable when only a single adjusting magnet, such as magnet 7, is used, rather than magnet segments 33,34.

Figure 14:
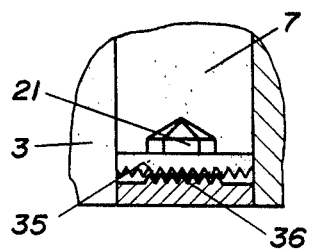
FIG. 14 is an enlarged partial cross-sectional view of the toothing.

According to FIG. 14, however, the toothing 35 can be molded into the end surface of the magnet segments 33, 34 when the magnet is produced. This process is particularly applicable if the adjusting magnet 7, or magnet segments 33, 34, are comprised of powdered permanent magnet material which has been imbedded in a binder material; this mixture then being pressed or injection-molded to form the magnet. The toothing 35 is engaged by a spring-mounted catching element, which in the embodiment according to FIGS. 13 and 14 takes the form of a toothed segment 36. The toothed segment 36 has been attached to a spring sheet 37 so that it engages under pretension in the toothing 35 of the adjusting magnet 7, or the magnet segments 33, 34. The toothed segment 36 can be separately fastened to the spring sheet 37. However, it is also possible to press the teeth directly into the spring sheet 37. The toothed segment 36 can also be made of a plastic material. The spring sheet 37 and toothed segment 36 are fastened to the carrier body 1 by means of a notched rivet 38.

If a single adjusting magnet is used, such as magnet 7, it is sufficient to attach the toothing 35 on only one end surface. However, it will be necessary to provide a holding sheet in the bore 32 of the carrier body 1 adjacent the end surface which does not contain the toothing 35. The holding sheet can e fastened to the carrier body 1 by means of the notched rivet 38.

It should be recognized that in all of the embodiments of this invention, the net amount of magnetic flux in the airgap is controlled by adding or subtracting lines of magnetic flux produced by the adjusting magnet to the lines of magnetic flux produced by the braking magnets. When the poles of the adjusting magnet are in alignment with the poles of the braking magnet the net magnitude of magnetic flux in the airgap is at a maximum. The effect is that the eddy currents induced in the conductive meter raking disc will be at a maximum, and the torque on the shaft of the raking disc will also be maximized. Adjusting the relative position of the movable magnet with respect to the braking magnets reduces the net amount of magnetic flux in the airgap which results in lower eddy currents and lower torque. When the poles of the adjusting magnet are moved 180° out of phase with respect to the aligned position, the net magnetic flux is minimized in the airgap, and the associated torque is also minimized. The invention provides a stepwise control for adjusting the system between these limits.

When the adjusting magnet is rotated through 180°, the braking torque can be adjusted from the minimum to the maximum. In the embodiments of the invention shown in FIGS. 12 through 14, the braking torque can be changed a maximum of 4 percent, that is, plus or minus 2 percent. If for example, the toothing 35 of the adjusting magnet 7 contains 80 teeth, rotation through 180° will involve 40 teeth. Thus a 0.1 percent change in the braking torque corresponds to one tooth; similarly, rotation through five teeth will change the braking torque by 0.5 percent. Therefore, this embodiment provides a means for rapidly and accurately adjusting the braking torque. In particular fine adjustment of the braking torque is marked and can e clearly observed, because whenever the position of the adjusting magnet 7 is changed from one tooth to the other the mechanical resistance of the catching member must be overcome. Furthermore, catching from tooth to tooth can be audibly perceived because the catching member engaging in each tooth makes a marked noise.

I claim:

1. An adjustable, permanent magnet, braking system for electric meters comprising:
    a U-shaped carrier body having spaced end members and a bridging member;
    a braking magnet fixed between the end members and having a surface facing an airgap to receive a nonmagnetic, electrically conductive meter braking disc between the end members and immediately adjacent said surface, said surface having a plurality of poles of alternating polarity; and
    an adjusting magnet smaller than said braking magnet contiguously positioned with respect to said braking magnet, said adjusting magnet having poles of alternating polarity corresponding to the poles of said braking magnet to control the magnet flux braking effect in the airgap, said adjusting magnet being movable with respect to said braking magnet for providing fine variations to the magnetic flux.

2. The braking magnet system of claim 1, wherein said braking magnet has a recess in which said movable adjusting magnet is positioned.

3. The braking magnet system of claim 2, wherein said movable adjusting magnet extends to an exterior surface of said braking magnet, and means for indicating the degree of braking is associated with said adjusting magnet.

4. The braking magnet system of claim 3, wherein said braking magnet recess is a centrally located aperture through said braking magnet which is perpendicular to the plane of the airgap, said carrier body having an aperture axially aligned with said braking magnet aperture, and said adjusting magnet is a cylinder pivoted in said apertures, the magnetic flux being controlled by turning the adjusting magnet in the apertures.

5. The braking magnet system of claim 3, wherein said braking magnet recess is rectangular and said movable adjusting magnet in the recess conforms to the recess, the magnetic flux being controlled by shifting said adjusting magnet in the recess.

6. The braking magnet system of claim 3, wherein said braking magnet recess is provided along the lateral surface of said braking magnet facing the joining bridge of said U-shaped carrier body, and said adjusting magnet may be shifted in the lateral direction along the recess for controlling the magnetic flux.

7. The braking magnet system of claim 1, wherein the braking magnet has been magnetized with three poles of alternating polarity along the surface facing the meter braking disc to form bowed lines of magnetic force inside said braking magnet to influence the rotation of the meter braking disc, and said adjusting magnet has been magnetized with poles of alternating polarity to have the pole spaces corresponding to the pole spaces of said braking magnet.

8. The braking magnet system of claim 1, wherein said braking magnet and said adjusting magnet are made from a permanent magnetic material of high coercive force, of more than 800 Oersteds.

9. The braking magnet system of claim 8, wherein said permanent magnetic material is a mixture of magnetic powder and a plastic binder, said mixture being shaped to form the permanent magnets by introduction of pressure and heat.

10. The braking magnet system of claim 6, wherein a bearing means is provided adjacent to the recess in said lateral surface of said braking magnet, said recess having a circular cross section, said bearing means having a matching recess of circular cross section for encircling said adjusting magnet, and said adjusting magnet is cylindrical.

11. The raking magnet system of claim 10, wherein said bearing means includes a screw spindle and a mating thread in said adjusting magnet in which the thread of said screw spindle engages for shifting the adjusting magnet with respect to the braking magnet.

12. The braking magnet system of claim 10, wherein said bearing means includes a screw spindle and a guiding nut fixed to said adjusting magnet in which the thread of said screw spindle engages for shifting the adjusting magnet with respect to the braking magnet.

13. The braking magnet system of claim 10, wherein a spring means is provided for movably fixing said adjusting magnet with respect to said braking magnet.

14. The braking magnet system of claim 1, wherein a cylindrical recess is provided along the lateral surface of said braking magnet which faces the bridging member of said U-shaped carrier body, said adjusting magnet being cylindrical and dimensionally capable of coaxial disposition within said recess.

15. The braking magnet system of claim 14, further including a plurality of teeth circumferentially disposed on at least one end surface of said cylindrical adjusting magnet and a spring-biased catching element secured to said carrier body and in releasable engagement with said teeth.

16. The braking magnet system of claim 15, wherein said catching element includes a plurality of teeth circumferentially disposed on one face thereof, said teeth being in releasable engagement with the teeth on said adjusting magnet.

17. The braking magnet system of claim 14, wherein said adjusting magnet is comprised of first and second segments, each of said segments having an exterior end surface, and a plurality of teeth circumferentially disposed on said exterior end surface.

18. The braking magnet system of claim 17, wherein one of said segments is larger than the other of said segments.

19. The braking magnet system of claim 17, wherein said first segment is magnetized to produce a flux density which differs from the flux density produced by said second segment.

20. An adjustable, permanent magnet braking system for electric meters comprising:
    a U-shaped carrier body having spaced end members and a bridging member;
    a pair of braking magnets each fixed to one end member and lying between said end members, each having a surface facing and defining an airgap there between to receive a nonmagnetic, electrically conductive braking metered disc in said airgap and immediately adjacent said surfaces, said surfaces each having a plurality of poles of alternating polarity; and
    an adjusting magnet smaller than said braking magnet contiguously positioned with respect to one of said braking magnets, said adjusting magnet having poles of alternating polarity corresponding to the poles of said one braking magnet to control the magnetic flux braking effect in the airgap, said adjusting magnet being movable with respect to said one raking magnet for providing fine variation to the magnetic flux between said braking magnets.